Dec. 22, 1936.　　　F. N. CHESTER　　　2,064,887
THERMOSTATIC CONTROL APPARATUS
Filed July 28, 1932
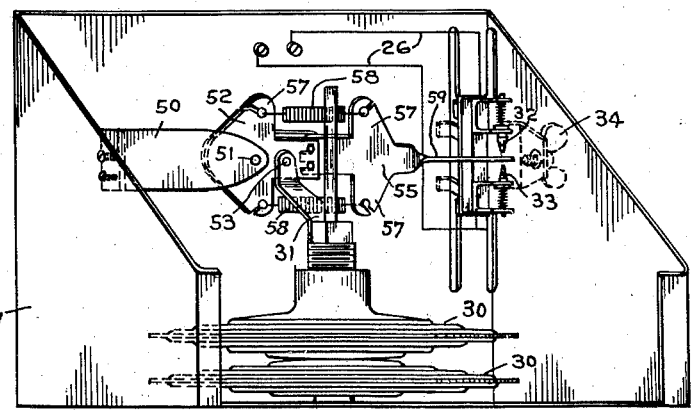
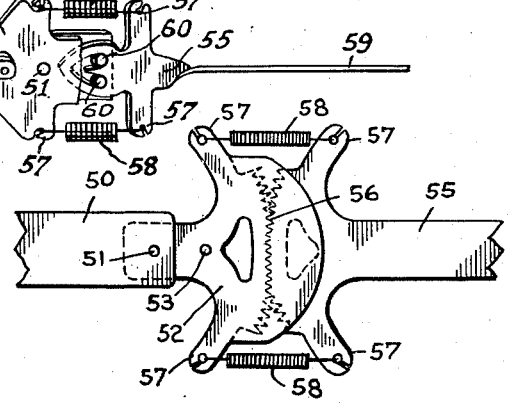
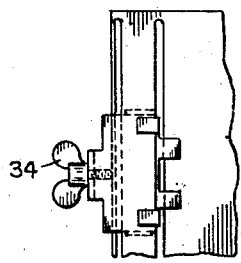
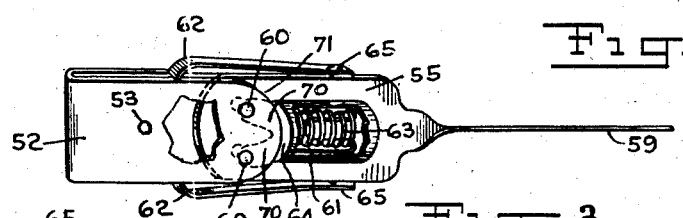
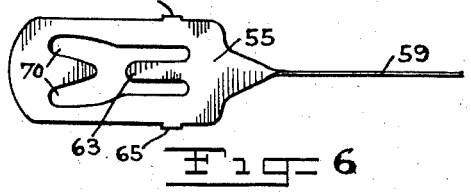
INVENTOR:
Frederick Norman Chester
BY
Edmund Conger Brown
Elizabeth E. Brown
ATTORNEYS.

Patented Dec. 22, 1936

2,064,887

UNITED STATES PATENT OFFICE 2,064,887

THERMOSTATIC CONTROL APPARATUS

Frederick Norman Chester, Jersey City, N. J.

Application July 28, 1932, Serial No. 625,227

8 Claims. (Cl. 200—140)

The invention relates to devices forming part of or adapted to be used in connection with thermostatic control apparatus, such as is used for regulating the temperature of rooms and apartments by admitting more or less cool outside air into the same, also for regulating the temperature of ovens and like apparatus by controlling the amount of heat supplied thereto, and for many other purposes, as will be well understood by those skilled in the art.

The invention particularly relates to certain details of construction of means interposed between said thermostatic devices proper and the temperature or other regulating devices which may be directly or indirectly controlled thereby, all as hereinafter more particularly described and pointed out.

One of the principal objects of the invention is to provide simple, efficient and economical means whereby a thermostatic device of the usual or any suitable type may be enabled to operate upon other mechanism, such as for instance ventilating devices, oven heat controlling devices, and many other kinds of devices which are capable of being efficiently controlled by means of a thermostatic device, such control being effected in the present invention through mechanism of such construction and in such manner that it shall be sensitively and delicately responsive to even very slight movements of the thermostatic device and yet be of such construction as to yield to extensive movements of such thermostatic device without breaking or injuring such mechanism. Further objects and advantages of the invention will be in part set forth in the following specification and in part will be obvious therefrom without being specifically pointed out, the same being realized and attained by means of the instrumentalities and characteristics and relative arrangements and combinations which will be hereinafter more particularly described or which will be pointed out in the claims hereof.

In devices of the kind under consideration which have been heretofore known in the prior art, it has been found very difficult to provide a suitable mechanism operated by the thermostatic device proper on the one hand and in turn operating a thermostatic controlled device on the other hand. Such mechanism in order to be satisfactory must be not only sensitive to a very slight movement of the thermostatic element, which is actuated by the change of temperature, but it must be such that it may not be broken by an unusual or abnormal extent of movement of the said thermostatic element. Mechanism has been suggested which will respond with sufficient sensitiveness to the small movements of the thermostatic element and will transmit the same to the controlled device, but such mechanism is necessarily delicate and is unable to adapt itself to a very large movement of the thermostatic element. On the other hand, mechanism has been suggested which will not be injured by excessive movement of the thermostatic element, but is yet incapable of responding satisfactorily to a small movement of the thermostatic element. These two requirements in the connecting mechanism are, as it will be readily seen, somewhat contradictory or opposed to each other, and it has been much desired to provide a mechanism which is capable of satisfactorily solving both phases of this problem. I believe that the construction herein set forth has overcome the difficulty above set forth, and has otherwise contributed to the advance of the art.

With the above and other objects of the invention in view, the invention consists in the novel construction, arrangement and combination of various devices, elements and parts, as set forth in the claims hereof, certain embodiments of the same being illustrated in the accompanying drawing and described in this specification.

In the accompanying drawing,

Fig. 1 represents a perspective view of the thermostatic control apparatus forming part of my invention;

Fig. 2 is a view of a modification of a part of the apparatus shown in Fig. 1;

Fig. 3 is a view of another modification of the said apparatus;

Figs. 4, 5, and 6 are detail views hereinafter more fully described; and

Fig. 7 is a view of another modification of the mechanism as shown in Figs. 1, 2, and 3.

I have shown in the drawing two different forms or modifications of the thermostat itself, either one of which would be practicable for use as a part of my invention, each of said forms being in itself well known in the art, and neither of which I claim as my invention in itself, but only its use in combination with the other elements of the invention herein set forth. In Fig. 1 I have shown a thermostat of the usual corrugated diaphragm type, the same being duplex as is usual in such cases. As will be well understood, any rise in temperature in the air surrounding such a thermostatic device causes an expansion of the liquid contained inside of the diaphragms 30 and 55 causes the same to open up, the upper part of the device, as shown in Fig. 1, being lifted to a considerable distance, proportionate to the rise in temperature. Upon the upper side of the thermostat is secured a member 31, which extends upwardly and is pivotally connected to the circuit-closing member hereinafter described, so that, when the temperature increases and the thermostat expands, the member 31 and the circuit-closing member are raised and contact is made with the upper contact-point 32, and when the temperature falls and the thermostat contracts, the member 31 descends and contact is made with the lower contact-point 33.

Another form of thermostat is shown in Fig. 9, being here of the ordinary well-known spirally wound bi-metallic element type. Here the spiral bi-metallic element is designated 40, and is secured in some suitable manner to the casing, as shown at 41. The outer end of the spiral is secured at 42 to the circuit-closing member above referred to and to be hereinafter more fully described.

The contact points with which said circuit-closing member makes contact when the device is in operation are suitably secured to the casing in a slidable manner and are capable of being adjusted vertically therein by means of a set-screw 34, shown plainly in Fig. 4, in a manner which will be well understood. From these contact-points lead the wires of an electric circuit 26.

It will be understood that in the arrangement of the device illustrated in Fig. 1, it is contemplated that when contact is made by the circuit-closing tongue with the upper contact-point 32, the circuit is closed and the current passes through one of the wires 26, operates or energizes a motor, magnet, or other device, as desired, and then passes back through a return wire grounded on the casing 27, but not shown in the drawing. When the tongue is depressed into contact with the contact-point 33, however, the circuit is closed through the other of said wires 26 and the same or another return wire.

The circuit-closing device itself will now be described. This device constitutes an important part of the structure, and the particular construction of the same by which it is enabled to be operated by the thermostat and yet to be yielding so as not to be injured or malformed by an excessive motion of the same, is an important feature of novelty in my invention.

I have shown this circuit-closing member in several forms or modifications, which I consider substantially equivalent to each other and within the spirit and scope of the invention, these different forms being illustrated in Figs. 1, 2, 3, and 7. The essential features in each of these forms are, however, similar or analogous, and equivalents of each other, and on the drawing corresponding numerals are applied to corresponding parts in the various forms.

In Fig. 1 the circuit-closing device is shown assembled in combination with other elements of the invention, but in Fig. 2 a somewhat simpler construction is shown, which may perhaps with advantage be first described and then the analogy of the same with the device shown in Fig. 1 pointed out.

Referring therefore to Fig. 2, it will be seen that a member 50 is provided, which is adapted to be rigidly secured to the casing of the device, as is shown in Fig. 1, where this same member is illustrated. To the member 50 is pivotally secured at 51 a member 52. To this member is pivotally secured at 53 a member 31 which extends upwardly from the thermostatic element. For the sake of clearness, this member is not shown in Fig. 2, but it and its location and manner of attachment will be seen in Fig. 1, in connection with the analogous form of circuit-closing device therein illustrated.

In the form of device shown in Fig. 2, the outer end of the member 52 is shown provided with teeth, so as to mesh with corresponding teeth in a second member 55, as shown in Fig. 2 at 56. Each of the members 52 and 55 is provided with lateral arms 57, and spiral springs 58 are provided which elastically connect the arms 57 of the members 52 and 55, in a manner which is clearly shown in Fig. 2 and which will be quite obvious from an examination of said figure. The effect of the said springs 58 is to draw the members 52 and 55 closely together and yet allow the member 55 to swing more or less freely up or down whenever the member 52 may be raised or lowered to an extent to which the member 55 may not be able to follow it. The member 55 terminates in a circuit-closing tongue such as is shown at 59 in Fig. 1 or in Figs. 3, 6 or 7, which tongue is adapted to make contact with the contact-points 32 or 33 (see Fig. 1) as the thermostat raises or lowers the device.

It will be obvious that a very substantial or excessive operation of the thermostat upon the circuit-closing device, which operation might be continued after the tongue 59 had reached the contact point, would, if continued, probably result in breaking or at least malformation of the device if the same were rigid or composed of parts integral with each other, whereas by the use of my improved device the circuit-closer, while still perfectly sensitive to a slight motion of the thermostatic element, is nevertheless able to sustain a continued and even excessive operation of the same after the circuit has been closed, without injury, inasmuch as the member 55, as shown in Fig. 2, will bend at an angle with the member 52, the teeth 56 meshing with each other and the spring 58 yielding so as to allow such bend but being adapted to restore the parts to normal condition as soon as the excessive pressure is relieved.

The action of the device shown in Fig. 1 is sufficiently analogous to the device shown in Fig. 2 as to be readily understood from what has been said with regard to the Fig. 2 form, and corresponding numerals are applied to corresponding parts. The principal difference between these two forms is that in Fig. 1 there is no provision for intermeshing gears or teeth, as shown in Fig. 2, for the purpose of holding the parts 52 and 55 in relative position, but in Fig. 1 the two parts are held together by pins 60 on the member 52, which operate in notches in the adjacent part of the member 55 in a manner which will be well understood, the member 52, as shown in Fig. 1, comprising two parallel leaves, connected by the pins 60 and between the ends of which the member 55 extends when the parts are assembled.

The action of the device shown in Fig. 3 is also sufficiently analogous to the other forms to be readily understood from what has been above said. In this form of the device the single spring 61 performs the same functions as those of the springs 58 shown in Figs. 1 and 2; in this form, however, the spring acts by pushing the two members 52 and 55 apart as far as may be, the said members 52 and 55 being held together, however, by the engagement of the pins 60 on the member 52 with the notches 70 in the member 55. The spring 61 is retained in place by the tongue or guide 63 on the member 55 (see particularly Fig. 6), around which the spring is coiled, and also by the sleeve cap 64 (shown in section in Fig. 5), which, when the device is assembled, surrounds the spring (the said cap being shown partly broken away in Fig. 3). The closed end or bearing surface of the cap 64 then bears against the curved end 71 of the member 52, in a manner which will be well understood from an inspection of Fig. 3.

The two flat springs shown in Fig. 3 and designated 62, are secured at 65 to the member 55 and bear upon the member 52, but it will be understood that these springs 62 are only necessary in cases where greater spring action is required, in addition to that provided by the spring 61, and that in many of the smaller embodiments of the device the latter alone will be sufficient.

The form of the device shown in Fig. 7, in connection with the bi-metallic element form of thermostat, is analogous in operation to the form shown in Fig. 1, but shows a slightly modified form of the member 55, which it will be seen cannot be removed, accidentally or otherwise, from the member 52 without first removing the pins 60.

The operation of my invention will be obvious from the drawing and from what has been above said with regard to the construction and assembling of the various details and parts as above set forth.

The advantage of my invention will be obvious from what has been above said, but it may be desirable to call attention to the especially novel and advantageous feature of the invention, namely, the construction of the operative mechanism intervening between the thermostatic element and the mechanical elements for opening and closing a ventilating device or performing such other uses as may be desired, such construction being adapted to respond immediately and certainly to a very slight movement of the thermostatic element and yet to permit an excessive, unexpected or unusual operation of the thermostatic element without injury to any of the necessarily somewhat delicate parts involved. This result is achieved by means of the peculiar construction of the parts, particularly shown in Fig. 1 and also on a larger scale and with more detail in Figs. 2, 3, 6, and 7.

I do not limit myself to the particular details of construction set forth in the foregoing specification and illustrated in the accompanying drawing, as the same refer to and set forth only certain embodiments of the invention and it is obvious that the same may be modified, within the scope of the appended claims, without departing from the spirit and scope of the invention.

Having thus described my invention, what I claim as new and desire to secure by Letters Patent is as follows:

1. A switch adapted for use in a device of the character herein described, comprising a circuit-closing arm adapted to be operated by a thermostatic element or the like, said arm comprising a plurality of members in combination operatively connected intermediate the point of connection to said thermostatic element or the like and the circuit-closing point, one of which members is adapted to be moved by the action of such thermostatic element or the like and another of which members is adapted to make contact with a contact point and thereby close an electric circuit when in such contact, and resilient means adapted to hold said parts of said arm normally in such position that the longitudinal axis of said member moved by said thermostatic element and the longitudinal axis of said member which contacts said contact-point and thereby closes said circuit shall be in one line.

2. A switch adapted for use in a device of the character herein described, comprising a circuit-closing arm adapted to be operated by a thermostatic element or the like, said arm comprising a plurality of parts in combination operatively connected intermediate the point of connection to said thermostatic element or the like and the circuit-closing point, one of which members is adapted to be moved by the action of such thermostatic element or the like and another of which members is adapted to make contact with a contact point and thereby close an electric circuit when in such contact, and resilient means adapted to hold said parts of said arm normally in such position that the longitudinal axes of said parts shall be in the same line but to permit said parts of said arm to gradually move angularly with relation to each other if pressure is applied to said arm when it is in a position which does not permit of further movement without such yielding whereby said arm shall normally operate as a unitary device and without change of position of said parts relatively to each other but upon an excessive movement of said thermostatic element or the like said parts of said arm may move angularly with relation to each other after coming in contact with a contact point and upon such excessive pressure being removed shall return to a substantially straight-line position relatively to each other.

3. A device as set forth in claim 2, in which one of said parts of said arm is provided with a plurality of notches and another of said parts is provided with a plurality of pins or the like adapted to be located at the ends of said notches respectively when said parts are in normal straight-line position, but when said parts are moved angularly with relation to each other one of said pins will act as the pivotal point of such relative movement and another of said pins will be temporarily removed from the end of its respective notch.

4. A device as set forth in claim 2, in which one of said parts of said arm is provided with a plurality of notches and another of said parts is provided with a plurality of pins or the like adapted to be located at the ends of said notches respectively when said parts are in normal straight-line position, but when said parts are moved angularly with relation to each other one of said pins will act as the pivotal point of such relative movement and another of said pins will be temporarily removed from the end of its respective notch, said resilient means tending to hold said pins normally at the ends of said notches respectively.

5. A device as set forth in claim 2, in which said arm comprises a plurality of parts adapted to contact edge to edge, and means adapted to prevent displacement of said parts out of the same plane relatively to each other.

6. A device as set forth in claim 2, in which said arm comprises a plurality of parts adapted to engage edge to edge and provided with teeth along said engaging edges and means adapted to hold said parts in the same plane relatively to each other, and in which said resilient means tend to prevent longitudinal separation of said parts.

7. A switch adapted for use in a device of the character herein described, comprising a thermostatic element and a circuit-closing arm adapted to be operated thereby, said arm comprising a plurality of parts in combination operatively connected intermediate the point of connection to said thermostatic element or the like and the circuit-closing point, one of which members is adapted to be moved by the action of such thermostatic element and another of which members is adapted to make contact with a contact point and thereby close an electric circuit when in such contact, and resilient means adapted to hold said parts of said arm normally in such position that the longitudinal axes of said parts respectively shall be in one line.

8. A switch adapted for use in a device of the character herein described, comprising a thermostatic element and a circuit-closing arm adapted to be operated thereby, said arm comprising a plurality of parts in combination operatively connected intermediate the point of connection to said thermostatic element and the circuit-closing point, one of which members is adapted to be moved by the action of such thermostatic element and another of which members is adapted to make contact with a contact point and thereby close an electric circuit when in such contact, and resilient means adapted to hold said parts of said arm normally in such position that the longitudinal axis of said member moved by said thermostatic element and the longitudinal axis of said member which contacts said contact-point and thereby closes said circuit shall be in the same line but to permit said parts of said arm to gradually move angularly with relation to each other if pressure is applied to said arm when it is in a position which does not permit of further movement without such yielding: whereby said parts and their operatively connecting means shall normally operate as a unitary arm having a substantially straight longitudinal axis and without change of position of said parts relatively to each other but upon an excessive movement of said thermostatic element said parts of said arm may move angularly with relation to each other after coming in contact with a contact point and upon such excessive pressure being removed shall return to a substantially straight-line position relatively to each other.

FREDERICK NORMAN CHESTER.